(12) United States Patent
Cochran et al.

(10) Patent No.: US 9,912,729 B2
(45) Date of Patent: Mar. 6, 2018

(54) ENCAPSULATION SCHEME FOR CLOUD COMPUTING ENVIRONMENT

(71) Applicant: Verizon Patent and Licensing Inc., Basking Ridge, NJ (US)

(72) Inventors: Marc J. Cochran, Shrewsbury, MA (US); Paul M. Curtis, Sudbury, MA (US); Kevin J. Clarke, Reading, MA (US); John F. Considine, Hollis, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

(21) Appl. No.: 13/947,529

(22) Filed: Jul. 22, 2013

(65) Prior Publication Data
US 2015/0026292 A1    Jan. 22, 2015

(51) Int. Cl.
*G06F 15/16* (2006.01)
*H04L 29/08* (2006.01)
*H04L 12/46* (2006.01)
*G06F 9/455* (2018.01)
*H04L 29/06* (2006.01)

(52) U.S. Cl.
CPC .......... *H04L 67/10* (2013.01); *G06F 9/45558* (2013.01); *H04L 12/4641* (2013.01); *H04L 67/2804* (2013.01); *G06F 2009/45595* (2013.01); *H04L 63/0272* (2013.01)

(58) Field of Classification Search
CPC ............. H04L 12/4633; H04L 12/4641; H04L 12/5689; H04L 12/5696; G06F 9/45533
USPC ........................................ 709/217; 370/392
See application file for complete search history.

(56) References Cited

U.S. PATENT DOCUMENTS

| | | | | |
|---|---|---|---|---|
| 6,515,993 B1* | 2/2003 | Williams | ............ | H04L 12/4645 370/395.1 |
| 6,781,989 B1* | 8/2004 | Acharya | ............. | H04L 12/4645 370/389 |
| 8,369,333 B2* | 2/2013 | Hao | ..................... | H04L 12/4633 370/392 |
| 2003/0118051 A1* | 6/2003 | Ooms | ..................... | H04L 45/00 370/471 |
| 2010/0142560 A1* | 6/2010 | Sharivker | ......... | H04L 29/12839 370/475 |
| 2011/0075667 A1* | 3/2011 | Li | ....................... | H04L 12/4633 370/392 |

(Continued)

OTHER PUBLICATIONS

IEEE Computer Society, "IEEE Standard for Local and Metropolitan Area Networks—Virtual Bridged Local Area Networks Amendment 4: Provider Bridges", IEEE Std 802.1ad—2005 (Amendment to IEEE Std 802.1Q-2005), May 26, 2006, 74 Pages.

(Continued)

*Primary Examiner* — Larry Donaghue
*Assistant Examiner* — Patrick Ngankam

(57) ABSTRACT

A first cloud computing device includes a first virtual machine, and receives, from the first virtual machine, a packet destined for a second virtual machine provided in a second cloud computing device. The device appends, to the packet, a header that includes an address of the second cloud computing device, a virtual local area network (VLAN) identifier of the first virtual machine, and a VLAN identifier of the second virtual machine. The device provides the packet and the header to a cloud computing network for provision to the second virtual machine.

20 Claims, 11 Drawing Sheets

(56) References Cited

U.S. PATENT DOCUMENTS

| | | | | |
|---|---|---|---|---|
| 2012/0096193 A1* | 4/2012 | Anzai | ............... | H04L 12/413 |
| | | | | 710/20 |
| 2013/0227303 A1* | 8/2013 | Kadatch | ............ | G06F 21/554 |
| | | | | 713/193 |
| 2014/0112137 A1* | 4/2014 | Schlansker | ........ | H04L 12/4641 |
| | | | | 370/235 |
| 2014/0269712 A1* | 9/2014 | Kidambi | ............ | H04L 12/4633 |
| | | | | 370/392 |

OTHER PUBLICATIONS

IEEE Computer Society, "IEEE Standard for Local and Metropolitan Area Networks—Virtual Bridged Local Area Networks Amendment 7: Provider Backbone Bridges", IEEE Std 802.1ah—2008 (Amendment to IEEE Std 802.1Q-2005), Aug. 14, 2008, 121 Pages.

* cited by examiner

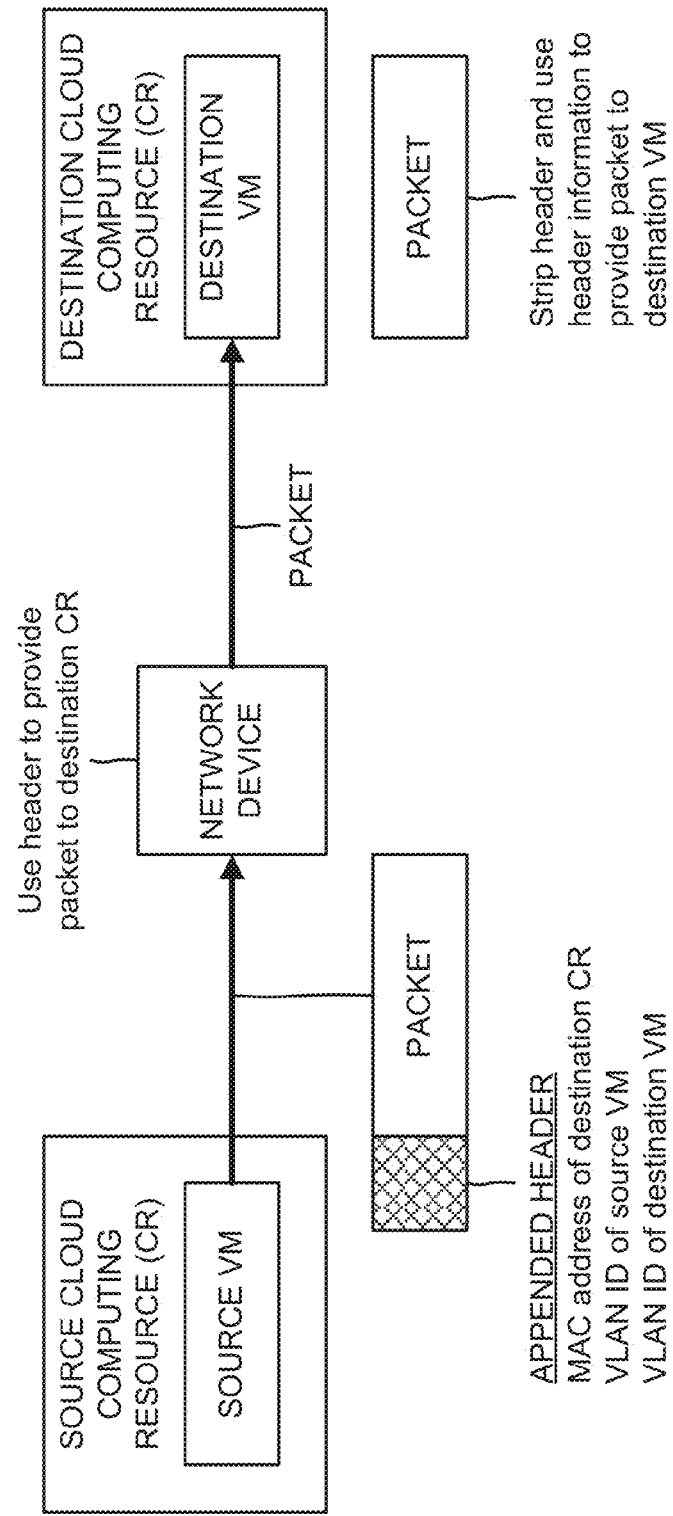

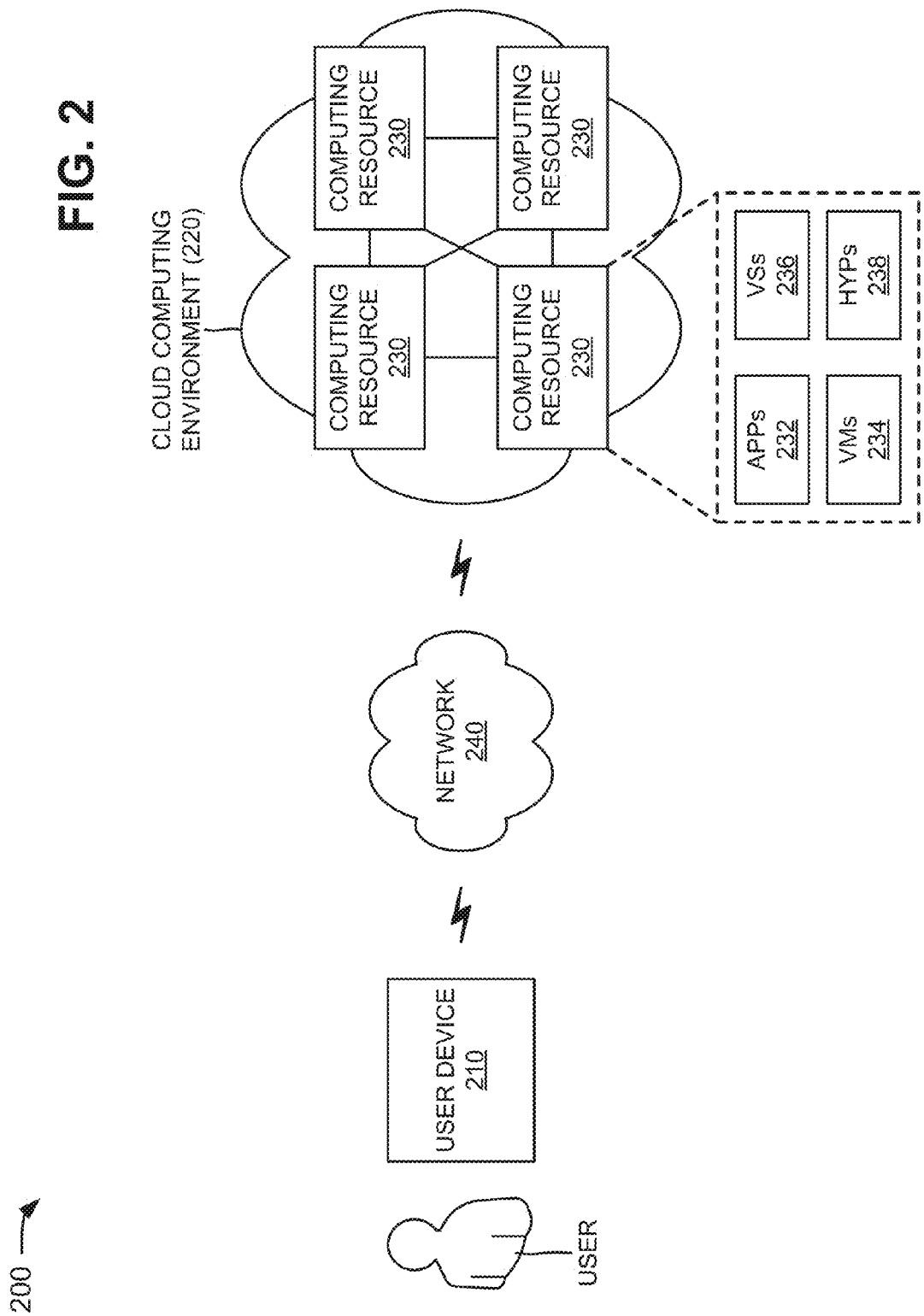

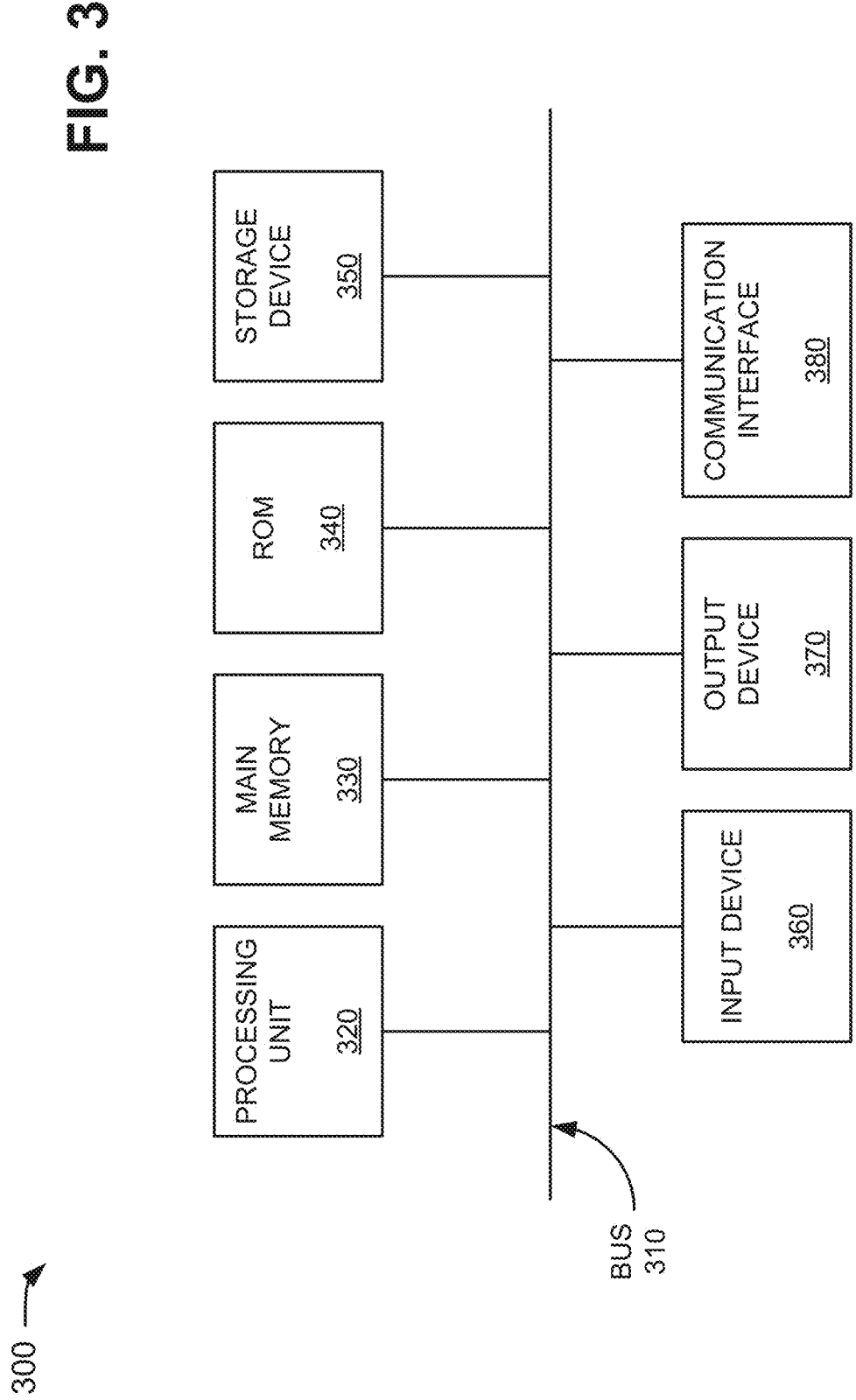

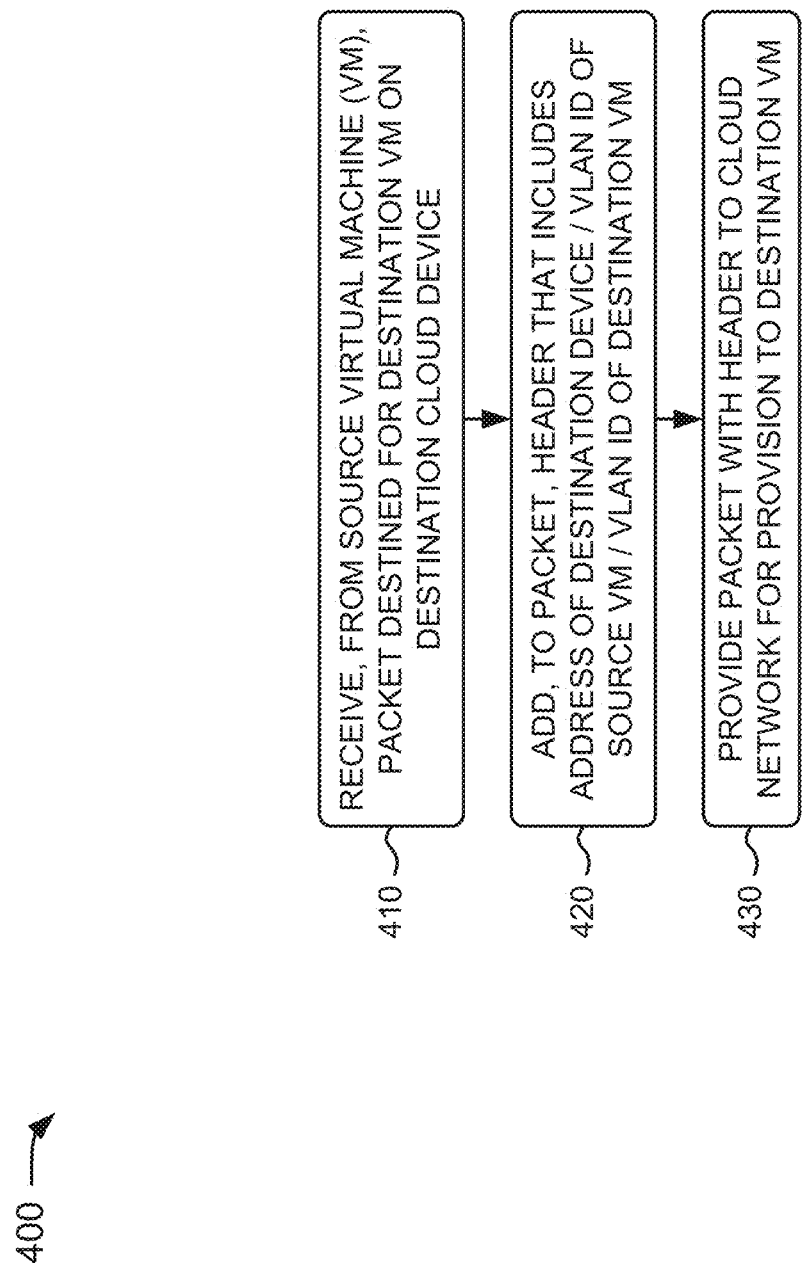

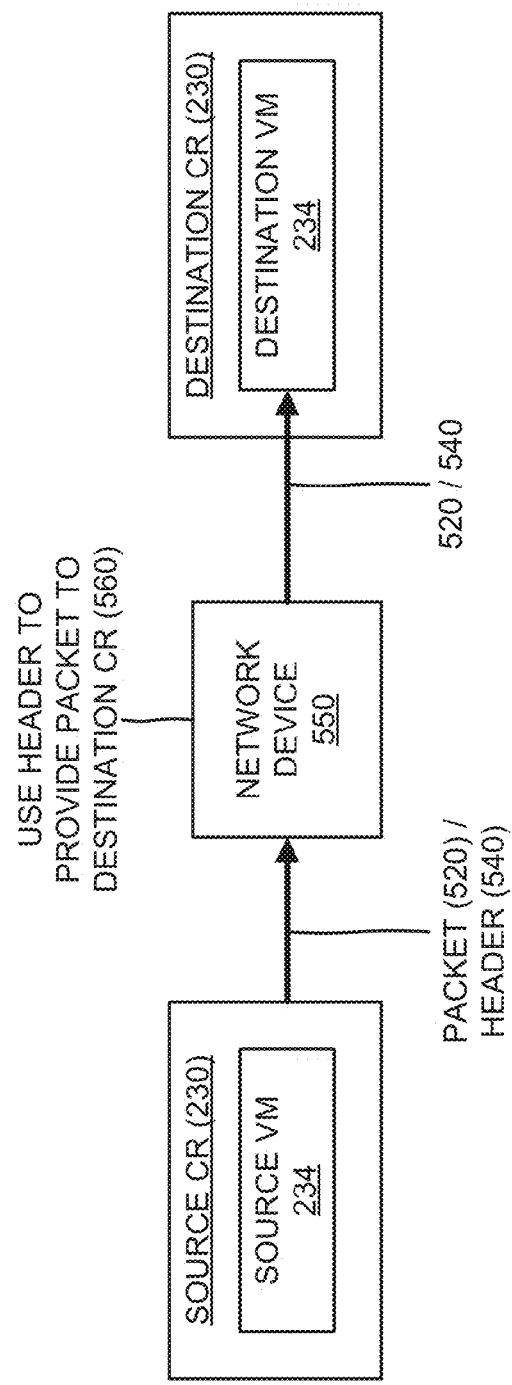

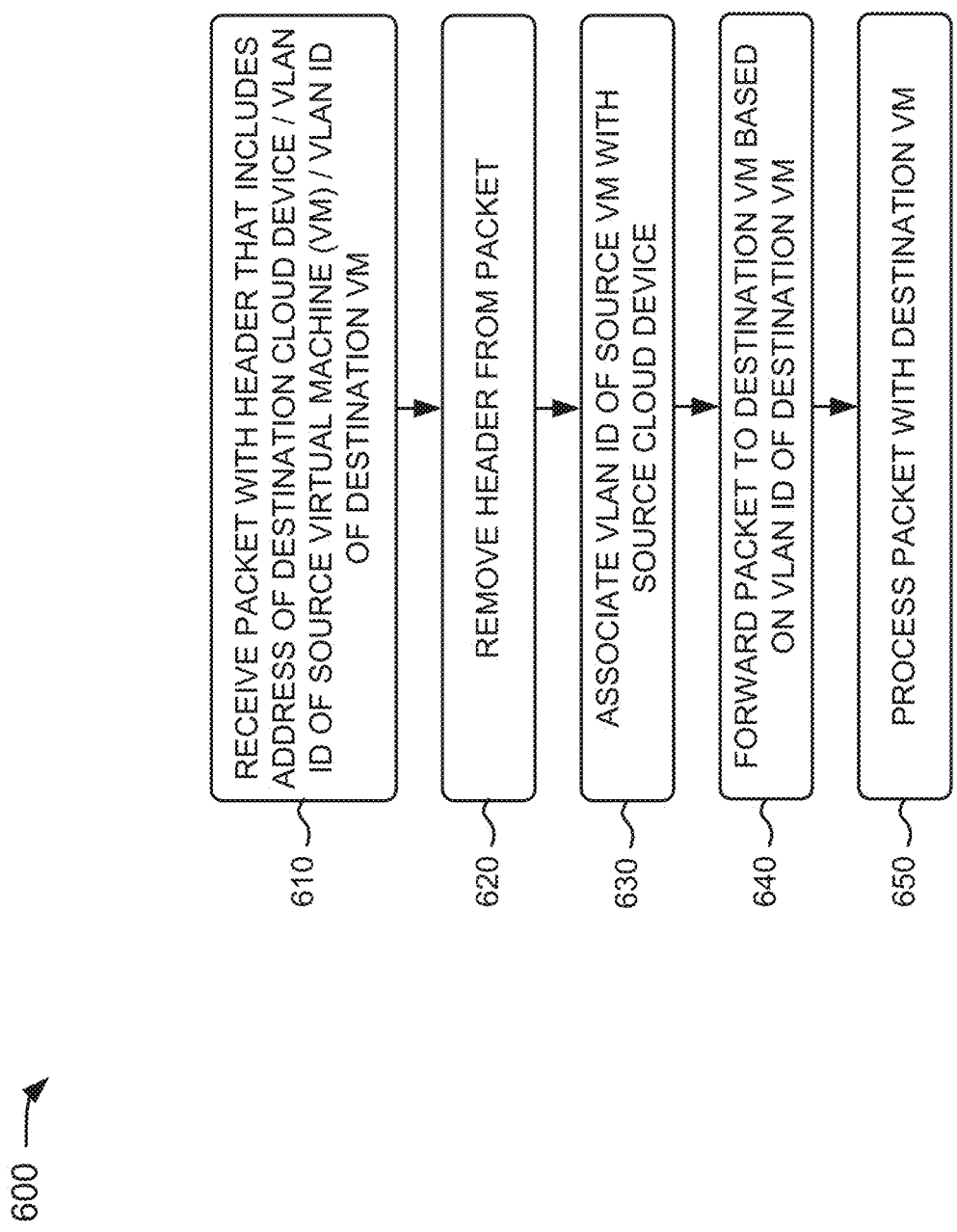

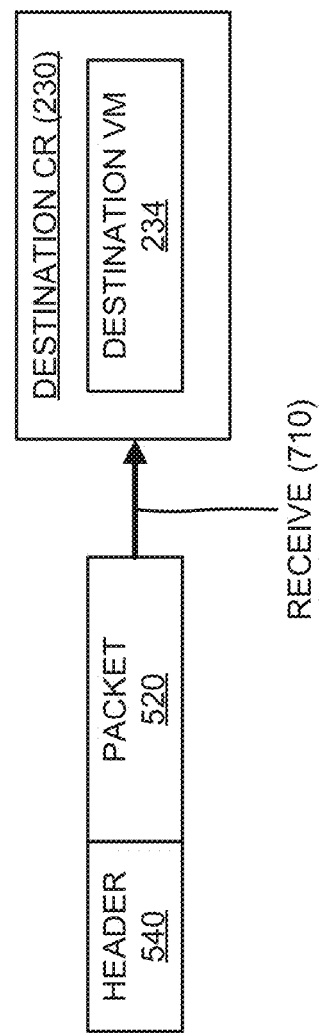

ENCAPSULATION SCHEME FOR CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. Cloud providers may use software defined networks (SDNs) to manage the VMs in the cloud computing environment. The SDNs may utilize standard network devices (e.g., switches) to manage communication between the VMs. Despite managing over 4,000 virtual local area networks (VLANs) and 16,000 media access control (MAC) addresses, the standard network devices are unable to manage communications between the large number of VMs provided in a cloud computing environment.

BRIEF DESCRIPTION OF THE DRAWINGS

FIG. 1 is a diagram of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for appending a header to a packet destined for a destination virtual machine;

FIGS. 5A-5C are diagrams of an example of the process described in connection with FIG. 4;

FIG. 6 is a flow chart of an example process for receiving a packet with a header and forwarding the packet to a destination virtual machine; and FIGS. 7A-7C are diagrams of an example of the process described in connection with FIG. 6.

DETAILED DESCRIPTION OF PREFERRED EMBODIMENTS

Figure 5A:
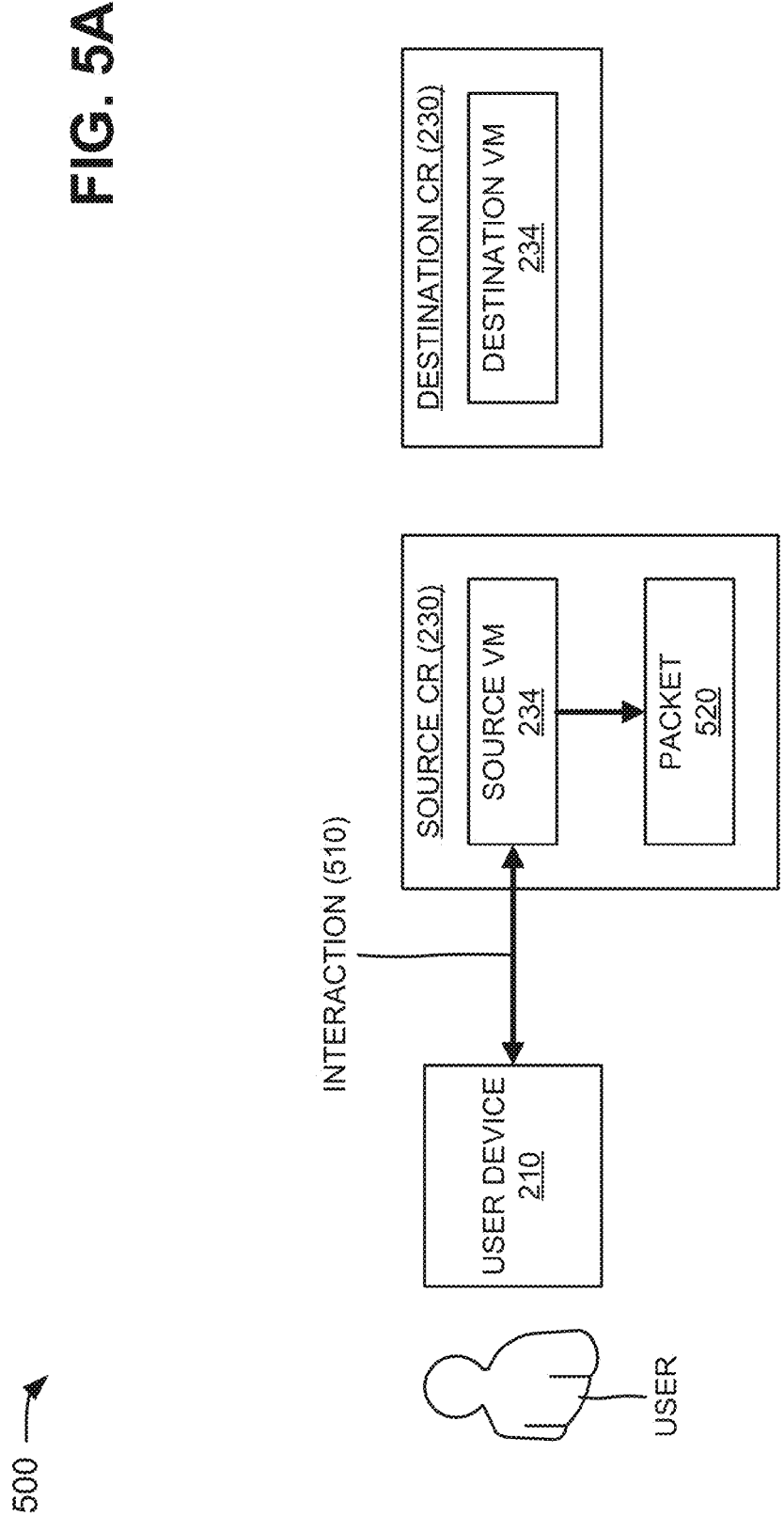

The following detailed description refers to the accompanying drawings. The same reference numbers in different drawings may identify the same or similar elements.

Systems and/or methods described herein may provide a Layer 2 (e.g., a data link layer) encapsulation scheme for communication between VMs. A source cloud computing device may include a source VM that generates a packet to be sent to a destination VM provided on a destination cloud computing device. The source cloud computing device may append a header on the packet before sending the packet to the destination cloud computing device. The header may include an address of the destination cloud computing device, a VLAN identifier of the source VM, and a VLAN identifier of the destination VM. The destination cloud computing device may receive the packet based on the address contained in the header. The destination cloud computing device may forward the packet to the destination VM based on the VLAN identifier of the destination VM.

FIG. 1 is a diagram of an overview of example implementations described herein. For the overview, assume that a cloud computing environment includes multiple computing resources (CRs) connected by multiple network devices. The network devices may include routers, switches, gateways, and/or other devices that process and/or transfer traffic (e.g., packets). Further assume that that a user of the cloud computing environment interacts with a VM (e.g., a source VM) provided in a cloud CR (e.g., a source cloud CR). For example, the user may provide information (e.g., a packet) to the source VM or may cause the source VM to generate a packet.

For the overview, assume that the source VM, of the source cloud CR generates or receives a packet destined for a destination VM of a destination cloud CR. The source cloud CR may receive the packet from the source VM, and may append a header to the packet (i.e., may encapsulate the packet with the header). The header may include an address (e.g., a MAC address) of the destination cloud CR, a VLAN identifier (e.g., a tag) of the source VM, and a VLAN identifier (e.g., a tag) of the destination VM.

As shown in FIG. 1, the source cloud CR may forward the packet, with the header, to a network device. The network device may utilize the header to provide the packet, with the header, to the destination cloud CR directly or via one or more other network devices. For example, the network device may use the MAC address of the destination cloud CR in order to provide the packet to the destination cloud CR. The destination cloud CR may receive the packet and the header, and may strip the header from the packet. The destination cloud CR may utilize the header information to provide the packet to the destination VM. For example, the destination cloud CR may utilize the VLAN identifier of the destination VM in order to provide the packet to the destination VM. The destination VM may receive the packet, and may process the packet based on information provided in or requested by the packet.

Such an arrangement may enable network devices in a cloud computing environment to support any number of VMs provided in the cloud computing environment. The arrangement may permit encapsulation of packets communicated between VMs on different computing resources so that the network devices (e.g., connecting the VMs) do not need to keep track of VLAN identifiers used to identify the VMs.

FIG. 2 is a diagram of an example environment 200 in which systems and/or methods described herein may be implemented. As illustrated, environment 200 may include a user device 210 interconnected with a cloud computing environment 220 via a network 240. Components of environment 200 may interconnect via wired connections, wireless connections, or a combination of wired and wireless connections.

User device 210 may include one or more devices that are capable of communicating with cloud computing environment 220 via network 240. For example, user device 210 may include a laptop computer, a personal computer, a tablet computer, a desktop computer, a workstation computer, a smart phone, a personal digital assistant (PDA), and/or other computation and communication devices. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230). Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VSs) 236, one or more hypervisors (HYPs) 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Network 240 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, application-specific integrated circuits (ASICs), field-programmable gate arrays (FPGAs), or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for appending a header to a packet destined for a destination virtual machine. In some implementations, process 400 may be performed by computing resource 230. In some implementations, process 400 may be performed by another device or a group of devices separate from or including computing resource 230.

As shown in FIG. 4, process 400 may include receiving, from a source virtual machine (VM), a packet destined for a destination VM on a destination cloud device (block 410). For example, a user associated with user device 210 may utilize a particular virtual machine 234 of a particular computing resource 230. The particular virtual machine 234 may be referred to as a source virtual machine 234, and the particular computing resource 230 may be referred to as a source computing resource 230. In some implementations, user device 210 may access software, services, storage, etc. provided by the source virtual machine 234. User device 210 may provide a packet to the source virtual machine 234 or may cause the source virtual machine 234 to generate a packet based on the interactions between user device 210 and the source virtual machine 234.

In some implementations, the packet may be destined for a destination virtual machine 234 provided on a destination computing resource 230. For example, the source virtual machine 234 may need a service, information, etc., provided by the destination virtual machine 234, in order to appropriately serve user device 210. The source virtual machine 234 may utilize the packet to receive the service, information, etc. provided by the destination virtual machine 234. In some implementations, the source computing resource 230 may receive the packet the from the source virtual machine 234. In some implementations, the packet may include an Internet protocol (IP) over Ethernet packet.

As further shown in FIG. 4, process 400 may include adding, to the packet, a header that includes an address of the destination cloud device, a VLAN identifier (ID) of the source VM, and a VLAN ID of the destination VM (block 420). For example, the source computing resource 230 may add a header to the packet (also referred to as encapsulating the packet with the header). In some implementations, the header may include an address (e.g., a MAC address) associated with the destination computing resource 230, a VLAN identifier (e.g., a tag) associated with the source virtual machine 234, a VLAN identifier (e.g., a tag) associated with the destination virtual machine 234, etc.

In some implementations, a portion of the information included in the header may be provided by information contained in the packet. For example, if the packet includes the address associated with the destination computing resource 234, the header may include a pointer that points to address in the packet. Utilizing some information from the packet in the header may reduce overhead in the packet and the header, which may help prevent congestion in network devices of cloud computing environment 220.

Returning to FIG. 4, process 400 may include providing the packet, with the header, to a cloud network for provision to the destination VM (block 430). For example, the source computing resource 230 may provide the packet, with the added header, to a network device of cloud computing environment 220. The network device may utilize the address associated with the destination computing resource 230 to forward the packet and the header through cloud computing environment 220. For example, if the network device is connected to the destination computing resource 230, the network device may utilize the address to forward the packet and the header to the destination computing resource 230. If the network device is not connected to the destination computing resource 230, the network device may utilize the address to forward the packet and the header to a next hop network device (e.g., closer to the destination computing resource 230). The destination computing resource 230 may receive the packet and the header, and may provide the packet to the destination virtual machine 234.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5B:
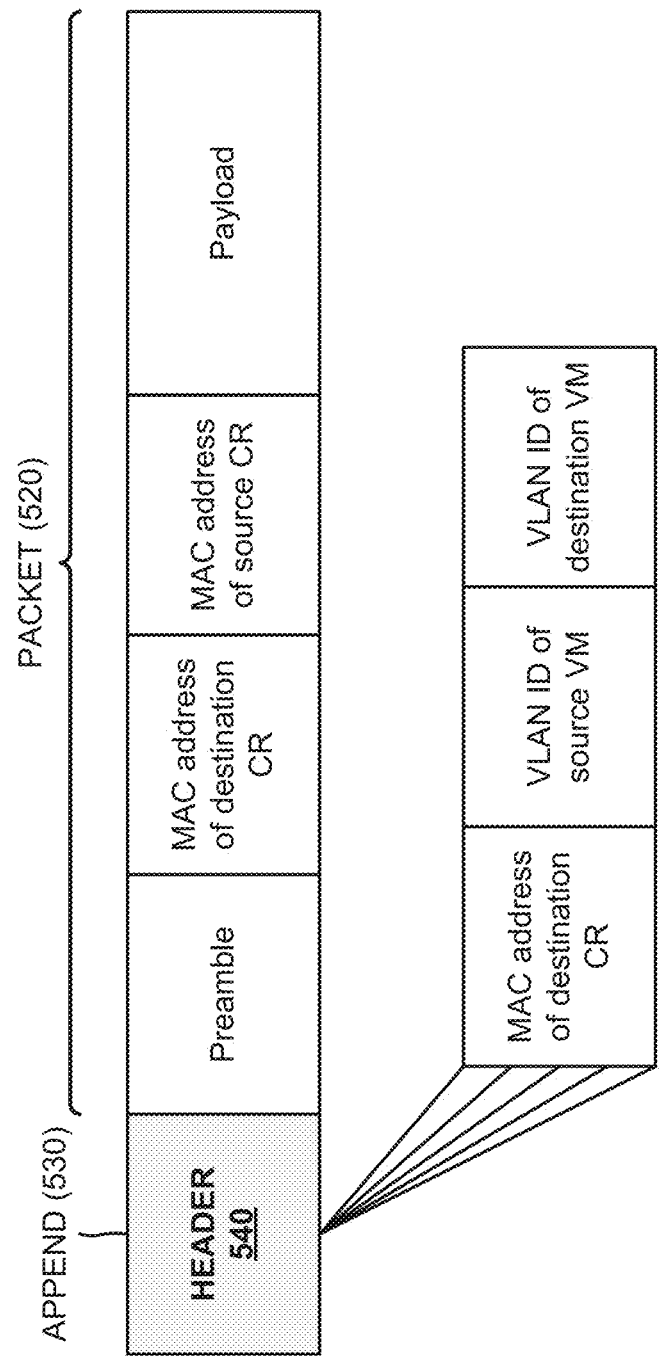

FIGS. 5A-5C are diagrams of an example 500 of the process described above with respect to FIG. 4. In example 500, assume that a user, associated with user device 210, subscribes to service(s), resource(s), etc. provided by cloud computing environment 220. For example, the user may utilize service(s), resource(s), etc. provided by a source virtual machine 234 of a source computing resource 230. As shown in FIG. 5A, user device 210 may interact with the source virtual machine 234, as indicated by reference number 510. Interaction 510 of user device 210 and the source virtual machine 234 may result in a packet 520 being provided to the source computing resource 230. For example, user device 210 may provide packet 520 to the source computing resource 230 via the source virtual machine 234.

Packet 520 may include a frame, a datagram, a packet, or a cell; a fragment of a frame, a fragment of a datagram, a fragment of a packet, or a fragment of a cell; or another type, arrangement, or packaging of data. In some implementations, packet 520 may include an IP over Ethernet frame. In example 500, further assume that packet 520 is destined for a destination virtual machine 234 of a destination computing resource 230, as further shown in FIG. 5A. Packet 520 may include information that instructs the source computing resource 230 to forward packet 520 to the destination virtual machine 234.

As shown in FIG. 5B, packet 520 may include a variety of fields, such as, for example, a preamble, a MAC address of the destination CR, a MAC address of the source CR, a payload, etc. The preamble may include a synchronization pattern that is used to establish synchronization. After synchronization is established, the preamble may be used to locate a first bit of packet 520. The MAC address of the destination CR may include a MAC address of the destination computing resource 230. The MAC address of the source CR may include a MAC address of the source computing resource 230. The payload may include user data to be delivered to the destination computing resource 230.

As further shown in FIG. 5B, the source computing resource 230 may append, as indicated by reference number 530, a header 540 to packet 520. Header 540 may include a variety of fields, such as, for example, a MAC address of the destination CR, a VLAN ID of the source VM, a VLAN ID of the destination VM, etc. The MAC address of the destination CR may include a MAC address of the destination computing resource 230. In some implementations, this field may include a pointer to the MAC address of the destination CR provided in packet 520. The VLAN ID of the source VM may include a VLAN tag of the source virtual machine 234. The VLAN ID of the destination VM may include a VLAN tag of the destination virtual machine 234.

As shown in FIG. 5C, the source computing resource 230 may provide packet 520 and header 540 to a network device 550 provided in cloud computing environment 220. Network device 550 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In example 500, network device 550 may use information in header 540 to provide packet 520 and header 540 to the destination computing resource 230. For example, network device 550 may use the MAC address of the destination computing resource 230, provided in header 540, in order to forward packet 520 and header 540 to the destination computing resource 230. As further shown in FIG. 5C, the destination computing resource 230 may receive packet 520 and header 540, and may provide packet 520 to the destination virtual machine 234 for further processing.

As indicated above, FIGS. 5A-5C are provided merely as an example. Other examples are possible and may differ from what was described with regard to FIGS. 5A-5C.

FIG. 6 is a flow chart of an example process 600 for receiving a packet with a header and forwarding the packet to a destination virtual machine. In some implementations, process 600 may be performed by computing resource 230. In some implementations, process 600 may be performed by another device or a group of devices separate from or including computing resource 230.

As shown in FIG. 6, process 600 may include receiving a packet with a header that includes an address of a destination cloud device, a VLAN ID of a source virtual machine (VM), and a VLAN ID of a destination VM (block 610). For example, user device 210 may provide a packet to a source virtual machine 234 (e.g., of a source computing resource 230) or may cause the source virtual machine 234 to generate a packet based on the interactions between user device 210 and the source virtual machine 234. The source computing resource 230 may add or encapsulate the packet with a header. In some implementations, the header may include an address (e.g., a MAC address) associated with a destination computing resource 230, a VLAN identifier (e.g., a tag) associated with the source virtual machine 234, a VLAN identifier (e.g., a tag) associated with a destination virtual machine 234, etc.

The source computing resource 230 may provide the packet, with the added header, to a network device of cloud computing environment 220. The network device may utilize the address associated with the destination computing resource 230 to forward the packet and the header through cloud computing environment 220. For example, if the network device is connected to the destination computing resource 230, the network device may utilize the address to forward the packet and the header to the destination computing resource 230. The destination computing resource 230 may receive the packet and the header.

As further shown in FIG. 6, process 600 may include removing the header from the packet (block 620). For example, the destination computing resource 230 may remove the header from the packet, and may read the information provided in the header. In some implementations, the destination computing resource 230 may utilize the information provided in the header to forward the packet to an appropriate destination (e.g., the destination virtual machine 234).

Returning to FIG. 6, process 600 may include associating the VLAN ID of the source VM with a source cloud device (block 630). For example, the destination computing resource 230 may associate the VLAN identifier, associated with the source virtual machine 234, with the source computing resource 230. In some implementations, the destination computing resource 230 may utilize information associated with the source computing resource 230 to determine information associated with the packet. For example, if the source computing resource 230 provides a cloud service that requires user authentication, the destination computing resource 230 may utilize this information to determine that the packet requires user authentication before the packet is processed.

As further shown in FIG. 6, process 600 may include forwarding the packet to the destination VM based on the VLAN ID of the destination VM (block 640). For example, the destination computing resource 230 may utilize the VLAN identifier, associated with the destination virtual machine 234, to forward the packet (e.g., without the header) to the destination virtual machine 234. The destination virtual machine 234 may receive the packet.

Returning to FIG. 6, process 600 may include processing the packet with the destination VM (block 650). For example, the destination virtual machine 234 may process the packet based on information contained in the packet. In some implementations, the packet may request that the destination virtual machine 234 perform a particular function and return results based on performance of the particular function. The destination virtual machine 234 may perform the particular function to generate results, and may return the results to the source virtual machine 234 in manner similar to the way that the packet is provided to the destination virtual machine 234. In some implementations, the packet may request that the destination virtual machine 234 authenticate the user for a service provided by the source virtual machine 234. The destination virtual machine 234 may determine whether the user is authenticated, and may return the authentication results to the source virtual machine 234 in manner similar to the way that the packet is provided to the destination virtual machine 234.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7B:
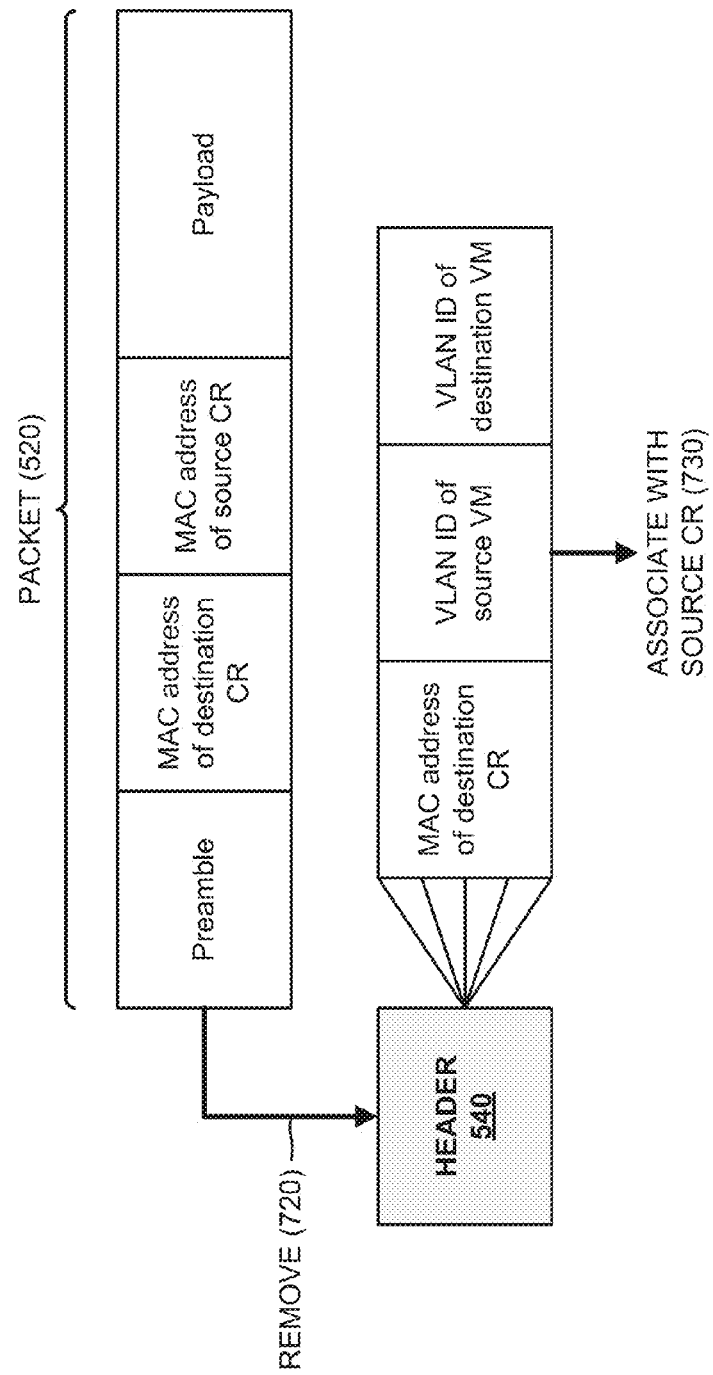
Figure 7C:
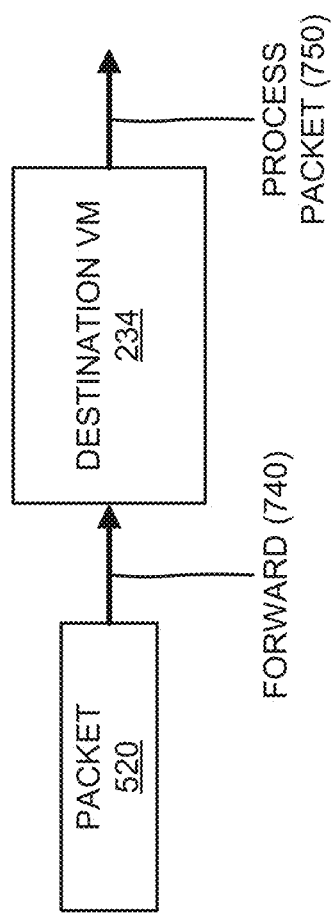

FIGS. 7A-7C are diagrams of an example 700 of the process described above with respect to FIG. 6. In example 700, assume that the source computing resource 230 provides packet 520 and header 540 to network device 550 provided in cloud computing environment 220. Packet 520, header 540, and network device 550 may include the features described above in connection with FIGS. 5A-5C. Further assume that network device 550 uses information in header 540 to provide packet 520 and header 540 to the destination computing resource 230, as shown in FIG. 7A. The destination computing resource 230 may receive packet 520 and header 540, as indicated by reference number 710.

As shown in FIG. 7B, the destination computing resource 230 may strip or remove header 540 from packet 520, as indicated by reference number 720. In some implementations, the destination computing resource 230 may utilize the information in header 540 to process and/or forward packet 520. For example, the destination computing resource 230 may associate the VLAN ID of the source virtual machine 234 with the source computing resource 230, as indicated by reference number 730. The destination computing resource 230 may utilize information associated with the source computing resource 230 to determine information associated with packet 520.

In some implementations, the destination computing resource 230 may utilize the VLAN ID of the destination virtual machine 234 in order to forward packet 520 to the destination virtual machine 234, as indicated by reference number 740 in FIG. 7C. The destination virtual machine 234 may receive packet 520, and may process packet 520, as indicated by reference number 750 in FIG. 7C. For example, the destination virtual machine 234 may perform a function, service, etc. requested by packet 520.

As indicated above, FIGS. 7A-7C are provided merely as an example. Other examples are possible and may differ from what was described with regard to FIGS. 7A-7C.

Systems and/or methods described herein may provide a Layer 2 encapsulation scheme for communication between VMs. A source cloud computing device may include a source VM that generates a packet to be sent to a destination VM provided on a destination cloud computing device. The source cloud computing device may append a header on the packet before sending the packet to the destination cloud computing device. The header may include an address of the destination cloud computing device, a VLAN identifier of the source VM, and a VLAN identifier of the destination VM. The destination cloud computing device may receive the packet based on the address contained in the header. The destination cloud computing device may forward the packet to the destination VM based on the VLAN identifier of the destination VM.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

As used herein, the term "user" is intended to be broadly interpreted to include a user device, or a user of a user device.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
generating a packet, by a source virtual machine provided in a source cloud computing device, that is destined for a destination virtual machine provided in a destination cloud computing device;
adding to the packet, by the source cloud computing device, a header that includes:
a pointer to a packet field of the packet,
the packet field including an address of the destination cloud computing device, and
the packet field not being located in the header of the packet,
a virtual local area network (VLAN) identifier of the source virtual machine, and
a VLAN identifier of the destination virtual machine;
providing the packet and the header, by the source cloud computing device, to a cloud computing network for provision to the destination virtual machine,
the header and the packet being provided to the destination cloud computing device associated with the destination virtual machine using the address in the packet field of the packet;

removing, by the destination cloud computing device, the header from the packet;

forwarding, by the destination cloud computing device, the packet without the header to the destination virtual machine based on the VLAN identifier of the destination virtual machine; and processing, by the destination cloud computing device, the packet with the destination virtual machine.

2. The method of claim 1, where use of the pointer, in the header, in place of the address of the destination cloud computing device, reduces an overhead of the header.

3. The method of claim 1, where providing the packet and the header to the cloud computing network comprises:

providing the packet and the header to a network device of the cloud computing network,
the network device utilizing the address of the destination cloud computing device to forward the packet and the header to the destination cloud computing device.

4. The method of claim 1, where the packet includes an Internet protocol (IP) over Ethernet packet.

5. A first cloud computing device, comprising:

a first virtual machine to generate a packet that is destined for a second virtual machine provided in a second cloud computing device; and one or more processors to:
append, to the packet, a header that includes:
a pointer to a packet field of the packet,
the packet field including an address of the second cloud computing device, and
the packet field not being located in the header of the packet,
a virtual local area network (VLAN) identifier of the first virtual machine, and
a VLAN identifier of the second virtual machine, and provide the packet and the header to a cloud computing network for provision to the second virtual machine,
the packet being provided to the second cloud computing device associated with the second virtual machine using the address in the packet field of the packet;

remove the header from the packet
forward the packet without the header to the second virtual machine based on the VLAN identifier of the second virtual machine; and
process the packet with the second virtual machine.

6. The first cloud computing device of claim 5, where use of the pointer, in the header, in place of the address of the second cloud computing device, reduces an overhead of the header.

7. The first cloud computing device of claim 5, where, when providing the packet and the header to the cloud computing network, the one or more processors are to:

provide the packet and the header to a network device of the cloud computing network,
the network device utilizing the address of the second cloud computing device to forward the packet and the header to the second cloud computing device.

8. The first cloud computing device of claim 5, where the packet includes an Internet protocol (IP) over Ethernet packet.

9. A method, comprising:

receiving, by a destination cloud computing device, a packet and a header,
the packet including:
a packet field including an address of the destination cloud computing device, and
the header including:
a virtual local area network (VLAN) identifier of a source virtual machine that generates the packet,
a VLAN identifier of a destination virtual machine provided in the destination cloud computing device, and
a pointer to the packet field of the packet,
the packet being provided to the destination cloud computing device using the address in the packet field of the packet, and
the packet field not being located in the header of the packet;

removing, by the destination cloud computing device, the header from the packet;

forwarding, by the destination cloud computing device, the packet without the header to the destination virtual machine based on the VLAN identifier of the destination virtual machine; and processing, by the destination cloud computing device, the packet with the destination virtual machine.

10. The method of claim 9, further comprising:

associating the VLAN identifier of the source virtual machine with a source cloud computing device that includes the source virtual machine.

11. The method of claim 9, where use of the pointer, in the header, in place of the address of the destination cloud computing device, reduces an overhead of the header.

12. A first cloud computing device, comprising:

a first virtual machine; and one or more processors to:
receive a packet and a header,
the packet including:
a packet field including an address of the first cloud computing device,
the header including:
a virtual local area network (VLAN) identifier of a second virtual machine that generates the packet, and
a VLAN identifier of the first virtual machine,
a pointer to the packet field of the packet,
the packet being provided to the first cloud computing device using the address in the packet field of the packet, and
the packet field not being located in the header of the packet, remove the header from the packet,
forward the packet without the header to the first virtual machine based on the VLAN identifier of the first virtual machine, and
process the packet with the first virtual machine.

13. The first cloud computing device of claim 12, where the one or more processors are to:

associate the VLAN identifier of the second virtual machine with a second cloud computing device that includes the second virtual machine.

14. The first cloud computing device of claim 12, where use of the pointer, in the header, in place of the address of the first cloud computing device, reduces an overhead of the header.

15. The first cloud computing device of claim 12, where, when processing the packet with the first virtual machine, the one or more processors are to:

request, based on the packet, for the first virtual machine to generate one or more results.

16. The first cloud computing device of claim 12, where the one or more processors are further to:
 return, to the second virtual machine, results of processing the packet with the first virtual machine.

17. The method of claim 9, where processing the packet with the destination virtual machine comprises:
 requesting that the destination virtual machine authenticate a user for a service provided by the source virtual machine.

18. The method of claim 9, further comprising:
 determining, based on processing the packet with the destination virtual machine, that a user is authenticated for a service provided by the source virtual machine; and
 returning an authentication result to the source virtual machine based on determining that the user is authenticated for the service provided by the source virtual machine.

19. The method of claim 1,
 where the packet includes a preamble,
  the preamble including a synchronization pattern for establishing synchronization, and
  the preamble providing a location of a first bit of the packet.

20. The first cloud computing device of claim 5,
 where the packet includes a preamble,
  the preamble comprising:
   a synchronization pattern for establishing synchronization.

\* \* \* \* \*